(12) United States Patent
Van Der Donk

(10) Patent No.: US 9,631,758 B2
(45) Date of Patent: Apr. 25, 2017

(54) CONNECTING PIECE FOR MULTILAYERED CONDUITS, METHOD OF CONNECTING, AND ASSEMBLY OBTAINED BY THE METHOD

(75) Inventor: Cornelis Augustinus Van Der Donk, Roosendaal (NL)

(73) Assignee: TERSIA B.V., Roosendaal (NL)

( * ) Notice: Subject to any disclaimer, the term of this patent is extended or adjusted under 35 U.S.C. 154(b) by 1088 days.

(21) Appl. No.: 13/820,271

(22) PCT Filed: Sep. 1, 2011

(86) PCT No.: PCT/NL2011/050598
§ 371 (c)(1),
(2), (4) Date: May 3, 2013

(87) PCT Pub. No.: WO2012/030221
PCT Pub. Date: Mar. 8, 2012

(65) Prior Publication Data
US 2013/0234430 A1    Sep. 12, 2013

(30) Foreign Application Priority Data

Sep. 2, 2010  (NL) ...................................... 2005306

(51) Int. Cl.
*F16L 21/00*  (2006.01)
*F16L 47/02*  (2006.01)
(Continued)

(52) U.S. Cl.
CPC .............. *F16L 47/02* (2013.01); *B29C 65/02* (2013.01); *B29C 66/12441* (2013.01);
(Continued)

(58) Field of Classification Search
USPC ........ 285/21.1, 330, 382.4, 382.5, 401, 398; 137/798; 138/39, 44, 109, 120, 155
See application file for complete search history.

(56) References Cited

U.S. PATENT DOCUMENTS 41,413 A * 1/1864 Robbins ............... B22D 19/085
249/175
96,962 A * 11/1869 Reinshagen .......... E21B 17/046
285/330
(Continued)

FOREIGN PATENT DOCUMENTS

CN  1948813 A   4/2007
DE  3901929 A1  4/1990
(Continued)

OTHER PUBLICATIONS

International Search Report for PCT/ISA/210 for International Application No. PCT/NL2011/050598 dated on Nov. 9, 2011.

*Primary Examiner* — Aaron Dunwoody
*Assistant Examiner* — Fannie Kee
(74) *Attorney, Agent, or Firm* — Harness, Dickey & Pierce, P.L.C.

(57) ABSTRACT

A coupling piece for an outer end of a multilayered conduit, includes a coupling pipe which is provided on the outer side with a radially upright wall, wherein the wall is widened in an axial direction at a radial distance from the outer side of the body. The outer side of the coupling pipe, the upright wall and the widened portion enclose an annular insertion space into which the outer end of the conduit can be directly inserted, wherein the inner wall of the coupling pipe is reinforced with an adjacent reinforcing layer which has a greater strength than the material of the coupling pipe. The reinforcing layer is provided with axial engaging elements, while the inner wall is provided with axial connecting elements which correspond with and connect to the engaging elements.

19 Claims, 2 Drawing Sheets

(51) Int. Cl.
*B29C 65/00* (2006.01)
*B29C 65/02* (2006.01)
*B29C 65/20* (2006.01)
*B29K 305/00* (2006.01)
*B29L 9/00* (2006.01)

(52) U.S. Cl.
CPC .. *B29C 66/12463* (2013.01); *B29C 66/12469* (2013.01); *B29C 66/5221* (2013.01); *B29C 66/52291* (2013.01); *B29C 66/52293* (2013.01); *B29C 66/52295* (2013.01); *B29C 66/636* (2013.01); *B29C 66/72321* (2013.01); *B29C 66/972* (2013.01); *B29C 66/974* (2013.01); *B29C 65/20* (2013.01); *B29C 66/71* (2013.01); *B29C 66/7392* (2013.01); *B29C 66/8167* (2013.01); *B29K 2305/00* (2013.01); *B29L 2009/003* (2013.01)

(56) References Cited

U.S. PATENT DOCUMENTS

| | | | | |
|---|---|---|---|---|
| 130,436 A * | 8/1872 | Magill et al. | ......... | F16L 37/088 285/308 |
| 704,909 A * | 7/1902 | Nycum | ............. | F16L 19/04 285/336 |
| 2,333,157 A * | 11/1943 | Douglass | ............. | F16L 19/041 285/334.2 |
| 2,623,837 A * | 12/1952 | Butler | ............. | B21D 39/046 156/221 |
| 3,047,937 A * | 8/1962 | De Vecchi | ......... | B29C 57/005 285/382.4 |
| 3,233,927 A * | 2/1966 | Dewhirst | ............. | F16L 9/18 285/401 |
| 3,674,292 A * | 7/1972 | Demler, Sr. | ......... | F16L 13/146 264/249 |
| 4,274,665 A * | 6/1981 | Marsh, Jr. | ............. | F16L 13/141 285/148.23 |
| 4,509,776 A * | 4/1985 | Yoshida | ............. | F16L 58/182 285/288.5 |
| 5,143,407 A * | 9/1992 | Cokeh | ............. | B29C 66/636 285/331 |
| 6,409,221 B1 * | 6/2002 | Robinson | ............. | F16L 37/252 285/360 |

FOREIGN PATENT DOCUMENTS

| | | |
|---|---|---|
| DE | 202008001101 U1 | 6/2008 |
| GB | 869437 A | 5/1961 |
| JP | 6147388 A | 5/1994 |
| JP | 7301374 A | 11/1995 |
| WO | WO-2009148318 A1 | 12/2009 |

* cited by examiner

CONNECTING PIECE FOR MULTILAYERED CONDUITS, METHOD OF CONNECTING, AND ASSEMBLY OBTAINED BY THE METHOD

The invention relates to a coupling piece for multilayered conduits, particularly to a coupling piece for multilayered conduits which is suitable for socket welding (international term: polyfusion welding).

Multilayered conduits for plastic conduit systems (PCS) are known as alternative to steel and copper for many applications, such as discharge of water, supply of water, gas and chemical substances. The multilayered conduits can comprise different types of plastic, with a base of for instance aluminium embedded in plastic for the purpose of improving the pressure resistance. Thermoplastic plastics are mostly used, such as polypropylene (PP), polyethylene (PE), polybutylene (PB) and sometimes PVC. The installing of a system comprises of forming combinations of pipe and connecting pieces, couplings and/or fittings. The type of fitting also determines the nature of the tool which has to be used. Much used are multilayered pipes which are constructed from PE pipes with aluminium base layer. The base layer is covered with the plastic here on the outside and on the inside.

With an estimated market share of 60%, these systems are the most used in the built environment. The great advantage of these systems is that they can bend in form-retaining manner, just as copper conduits, while they are in comparison much lighter in weight and less expensive.

The most interesting development relates to polyethylene pipes which are provided with an aluminium inner layer comprising a layer of polyethylene on either side. Such pipes are flexible and have a proven strength for the intended applications. Particularly interesting are pipes based on PE-RT (PE-Raised Temperature, a product of Dowlex), which can withstand temperatures of 90-95° C. and can be applied up to pressures of 10 bar.

The drawback of these known systems is that the fittings or couplings are expensive or time-consuming in terms of effecting the coupling.

Use is for instance made of a seal which is obtained by means of an O-ring on the coupling piece. The coupling piece is inserted or pushed into the conduit or pipe. The coupling piece is then squeezed shut with great force over the conduit or pipe by means of a sleeve.

As alternative coupling, push connections are also available for the conduits or pipes with an aluminium base. While these are practical, they are on the other hand expensive and there is, as well as the apparent convenience, a not inconsiderable risk of leakage as a result of the O-ring.

In addition, the use of welded fittings is known, wherein a coupling piece and an outer end of a conduit for coupling are heated using a welding device so that the parts for coupling become plastic. The technique is referred to as polyfusion welding or socket welding. In plastic state the parts are then fused by pressing the parts for coupling against each other or sliding them together and allowing them to cool.

The welding device is generally a hand tool provided with a lance as heat source, with heating elements, also known as welding mandrel and weld bush, which can be mounted on the outer end. The welding mandrel and weld bush are shaped such that they fit onto the contact surfaces of the respective coupling piece and the conduit outer end which have to be fused together. Following heating the two parts are pushed into each other in plastic state so that overlapping contact surfaces fuse together, wherein a connecting weld or weld rib is formed. A durable weld is obtained after cooling. The technique has the advantages that simple tools can be used and that the operations can be performed quickly (each operation lasts only a few seconds).

Known from patent publication JP 07301374 is a coupling piece which can be used to couple multilayered conduits by means of socket welding. The outer end of a conduit is pushed here into an annular space of a coupling piece, wherein the outer end of the conduit is fused with the coupling piece. The outer end of the conduit is adapted beforehand to be able to protrude into the annular space. The thickness of the conduit outer end is for this purpose reduced by removing a part of the outer surface and of the inner surface.

A significant drawback of this method is related to the structure of the multilayered conduits: they are generally provided with a thicker inner layer, a thin outer layer and a metal layer therebetween, these layers being interconnected by two adhesive layers. The whole pipe is constructed from five layers: outer layer, adhesive layer, aluminium, adhesive layer and inner layer. All these layers provide the resistance to pressure and temperature. The outer layer is thinner than the inner layer. The outer layer can be given a thinner form than the inner layer because the load is less great on the outer side of a conduit than on the inner side, where for instance in the case of PE-RT temperatures of 90-95° C. and pressures up to 10 bar are applied. By keeping the outer layer thin the product is less expensive, less voluminous and lower in weight. A function of the outer layer is to form a protective layer against oxygen from the atmosphere so that no corrosion of the metal layer occurs.

In newly developed PE pipes the aim is therefore the thinnest possible layer of PE on either side of the aluminium layer. A PE-RT pipe with aluminium base layer can for instance allow an outer layer of PE-RT of 0.3 mm, at a diameter of 16 mm. The inner layer of PE-RT is 1.2 mm and the overall wall thickness of the pipe including adhesive layers is 2.0 mm.

In the coupling of such multilayered conduits with a coupling piece as according to JP'374 it has been found that the integrity of the outer layer is lost: it is technically not easily possible to remove a part of the outer layer and simultaneously still have sufficient outer layer to cover the metal layer. There is therefore an increased risk of parts of the metal layer of the conduit becoming exposed, whereby undesired corrosion of the metal layer may occur.

A second problem occurs at the exits of the coupling pipe during the polyfusion welding to a conduit end. The exits of the coupling pipe protrude here into the conduit outer end, wherein the exits become to some extent plastic. The exits of the coupling pipe hereby tend to bend inward inside the conduit outer ends into which they have been inserted. This results in gap formation between the exit of the coupling pipe and the inner side of the conduit, whereby the adhesion is incomplete. This can go so far that the exit collapses inward and so blocks the passage through the coupling pipe. This problem occurs frequently in the case of a small outer diameter of the coupling pipe (for instance less than 25 mm) or in the case of a long heating time of the coupling pipe.

Due to the gap formation an imperfect weld to the inner wall of a conduit is in any case obtained, wherein the conduit can become susceptible to blockage at the position of the weld due to accumulation of dirt in a formed gap, whereby it can become wholly or partially clogged.

A third problem is that the obtained coupling between a coupling piece and two conduit outer ends is mechanically vulnerable at the position of the coupling piece in respect of diverse tensile or axial forces and torsional forces. The coupling can for instance crack and break at the position of the widened portion when high torsional forces are exerted by the conduit outer ends connected to the coupling piece.

The invention has for its object to wholly or partially obviate the drawbacks of the known prior art coupling pieces and to provide possible additional advantages by providing a coupling piece which is suitable for forming a durable and reliable coupling to a conduit outer end in simple and rapid manner by polyfusion welding.

In a first aspect the invention provides for this purpose a coupling piece for an outer end of a multilayered conduit, comprising a coupling pipe which is provided on the outer side with a radially upright wall, wherein the wall is widened in axial direction at a radial distance from the outer side of the body, wherein the outer side of the coupling pipe, the upright wall and the widened portion enclose an annular insertion space into which the outer end of the conduit can be directly inserted, and wherein the radial distance between the widened portion of the wall and the outer side of the coupling pipe at the position of the entry to the insertion space is such that it is greater than or equal to the wall thickness of the conduit, wherein the inner wall of the coupling pipe is reinforced with an adjacent reinforcing layer of reinforced plastic or of metal which has a greater strength than the material of the coupling pipe, and which layer is provided with axial engaging elements, while the inner wall is provided with axial connecting elements which correspond with and connect to the engaging elements.

Such a reinforcement of the inner wall imparts a greater mechanical strength to the coupling piece, this being important for application thereof wherein the coupling piece is exposed to diverse tensile, bending and torsional forces once it has been coupled to conduit outer ends. The axial orientation is particularly effective against bending and torsional forces. Axial is understood here to mean that the connecting elements and engaging elements extend in axial direction relative to the central axis of the coupling pipe. This results in the two respective elements engaging each other such that a bending or torsional force on the coupling pipe is likewise exerted on the reinforcing layer via these elements. The reinforcing layer hereby provides additional resistance to these forces. The reinforcing layer can, as a separate or an integrated element, form an assembly with the coupling pipe.

The reinforcing layer also has the advantage that inward bending of the exits of the coupling pipe is prevented during polyfusion welding. This therefore results in gap formation being prevented, and a problem-free flow through the conduits at the position of the coupling pieces.

In respect of the choice of material for the reinforcing layer the reinforced plastic can for instance be PVDF, POM, PPSU or a similar material, and brass, steel, etc. can for instance be applied as metal.

It has further been found that a simple coupling is possible for multilayered pipes when a coupling piece according to the invention is used. The conduit is pushed over the coupling piece as far as the upright wall and fits directly inside the annular space. An adjustment of the thickness of the outer end of the conduit is not necessary here, whereby a very simple method of polyfusion welding is made possible by the invention.

It has been found that during the coupling the metal layer is not exposed due to excessive deformation of the outer wall of the conduit and that a strong coupling is achieved between the outer side of the coupling piece and the inner layer of the conduit. This fused connection is further reinforced in that the outer end of the conduit fuses with the upright wall and the inner side of the widened portion. Three adhesion surfaces are in this way created.

The obtained fused connection can withstand the conditions in which PE-RT is applied (90-95° C. and 10 bar). The fused connection further forms a sealing layer for the metal intermediate layer of the conduit outer end so that it cannot be reached by oxygen from the atmosphere. If necessary, this enclosing fused connection can moreover be repaired from the outside. Protection against corrosion of the metal layer is hereby ensured.

In a special embodiment of the coupling piece according to the invention the connecting elements on the inner wall are embodied as elongate ridges running parallel to the central axis of the coupling pipe. The corresponding engaging elements of the reinforcing layer are embodied as elongate grooves. The reverse embodiment, wherein the engaging and connecting elements are embodied respectively as ridges and grooves, also forms part of the invention.

In a subsequent variant of the invention the annular space narrows in the direction of the wall in a manner such that the radial distance between the widened portion of the wall and the outer side of the coupling pipe decreases to a value smaller than the wall thickness of the conduit.

Such a design makes it possible for the outer end of the pipe to be properly clamped in the annular space of the coupling piece and an optimal fused connection to be obtained. Even more important is the additional effect that the fused connection or weld rib formed during the coupling by polyfusion welding is deformed in particular manner by the narrowing space. As a result of the narrowing space the weld rib formed between outer wall and widened portion is urged outward to some extent, whereby a protruding weld rib is obtained. The great advantage hereof is that on the basis of the protruding weld rib it is easy for a user to determine visually whether the obtained welded connection is of sufficient quality. It is thus possible in practice to carry out an immediate visual check on the obtained connection, this saving time.

The coupling piece according to the invention advantageously comprises a through-opening in the widened portion. The function hereof is to provide an inspection hole for monitoring the welded connection formed in the annular space. This has an additional advantageous effect in addition to the above stated protruding weld rib, or can be an alternative thereto. A part of the fused connection can moreover penetrate into the through-opening, this further reinforcing the connection.

In the coupling piece according to the invention the widened portion is more preferably smaller in axial direction than the axial length of the coupling pipe as measured from the upright wall to an outer end of the coupling pipe, and preferably smaller by a factor of 4 or more. The widened portion in fact forms the contact surface with the outer wall of the conduit and the outer side of the coupling pipe forms the contact surface with the inner wall of the conduit. Since the outer wall and inner wall of the conduit are subject to shear forces during insertion of the outer end of the conduit into the annular space of the coupling piece, it is advantageous to make the contact surface on the outer wall of the conduit relatively small and the contact surface of the inner wall with the coupling piece relatively large. An optimal strength of the connection is thus obtained, wherein the outer wall of the conduit is exposed as little as possible to shear forces, whereby the protection of the metal layer by the outer wall remains intact. The length of the part of the coupling pipe protruding into the conduit is preferably several centimeters, while the length of the widened portion is only several millimeters.

In the coupling piece according to the invention the upright wall and the widened portion preferably have a T-shaped cross-section. A coupling piece with such a form of the upright wall and the widened portion thereof is fairly easy to produce by injection moulding and creates a suitable annular space inside which the outer end of a conduit can be received. Such a design allows a conduit to be pushed over both axial ends of the coupling pipe as far as the wall, wherein the two connected conduit outer ends are separated only by the thickness of the wall of the coupling piece. This results in a coupling of two outer ends which is very strong because the outer ends are so close together, while the both outer ends are properly enclosed by the widened portions.

The coupling piece according to the invention is preferably formed substantially integrally. This simplifies production, for instance by injection moulding, of the coupling piece. The costs of the coupling piece can hereby be kept relatively low. The reinforcing layer of reinforced plastic can for instance be formed here by two-component (2K) injection-moulding.

The coupling piece, but not the reinforcing layer thereof, is more preferably formed substantially from material comprising PE, reinforced PE or PE-RT. Such materials are also used for multilayered conduits so that it is possible to opt for a combination of coupling piece and conduits comprising the same material. This is advantageous during coupling because the welding device can be set to one temperature to make the contact surfaces of the conduit and the coupling piece plastic.

The same advantages apply when the multilayered conduits are based on an inner wall and outer wall of PP-R, PB, PP, PVDF, PVC and the like. It is therefore possible to particularly consider making the coupling piece from a plastic corresponding to that of the walls of the conduits.

In the coupling piece according to the invention the inner diameter of the coupling pipe more preferably increases in outward direction at the exit. This increase in diameter is preferably gradual so that the inner wall tapers in longitudinal section. Such a tapering exit of the coupling pipe is found to be less susceptible, or not at all susceptible to the undesirable effect of bending inward. This therefore results in gap formation being prevented, and a problem-free flow through the conduits at the position of the coupling pieces.

Such a coupling piece is an alternative to the coupling piece according to the first aspect of the invention, since the problem of the coupling pipe bending inward at the position of the exit is still always solved even when connecting elements and reinforcing layer are omitted in the design.

In the coupling piece according to the invention the outer diameter of the coupling pipe is more advantageously reduced at the exit. During preheating of the coupling pipe on a weld bush this latter part of the outer periphery of the coupling pipe is hereby prevented from making contact with or coming in the vicinity of the hot weld bush. This further contributes toward preventing inward bending of the coupling pipe at the position of the exit. If desired, this variant of the invention can be embodied such that the coupling pipe has no connecting elements and the coupling piece has no reinforcing layer.

As a general alternative embodiment of the invention, the coupling piece can be provided on the outer side of the body with two upright walls with widened portion which are located some distance from each other. Such a design is suitable for more complex coupling pieces which form a T-joint, cross connection or elbow joint.

According to a second aspect, the invention relates to a welding device with mountable heating elements, wherein a first heating element has a form such that it connects to the surface of the annular space of the coupling piece according to the invention, and a second heating element has a form such that it connects to the surface of the outer end of a multilayered conduit coupled to the coupling piece. The welding device is thus suitable for coupling a coupling piece to a conduit outer end by polyfusion welding, whereby the above stated advantages are gained.

According to a third aspect, the invention relates to a method for coupling an outer end of a multilayered conduit to a coupling piece according to the invention by polyfusion welding, wherein the method comprises the steps of heating the contact surfaces of the coupling piece and of the outer end of the conduit, joining the contact surfaces and, after fusion, allowing the obtained fused connection to cool, wherein between conduit and coupling piece a connecting weld rib is obtained which protrudes from the annular space.

This method allows coupling of a coupling piece to a conduit outer end, wherein the advantages already stated above in respect of the narrowing annular space are achieved, whereby a protruding weld rib is obtained. If desired, the method according to the invention is embodied such that here the coupling pipe has no connecting elements and the coupling piece has no reinforcing layer.

Such a method is likewise effective because the narrowing annular space is here also present, whereby a protruding weld rib is obtained.

According to a fourth aspect, the invention relates to an assembly of a multilayered conduit with a coupling piece according to the invention obtained via the method according to the invention, wherein between conduit and coupling piece a connecting weld rib is obtained which protrudes from the annular space. The protruding weld rib has the advantage of an immediate visual check of the quality of the welded connection, as already elucidated above.

The invention is elucidated hereinbelow with reference to the accompanying drawings, in which.

Figure 1:
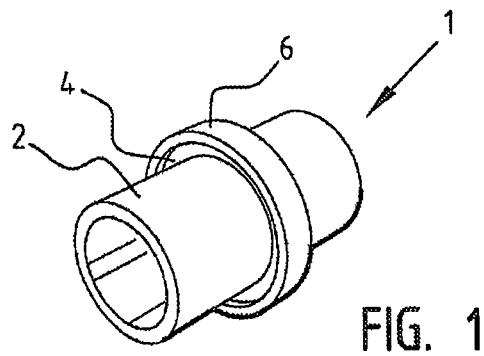
FIG. 1 is a perspective view of a coupling piece according to the invention.

FIG. 1 shows a coupling piece 1 constructed from a coupling pipe 2 and a wall 4 arranged on the outer side thereof with a widened portion 6 present as a ring around coupling pipe 2.

Figure 2:
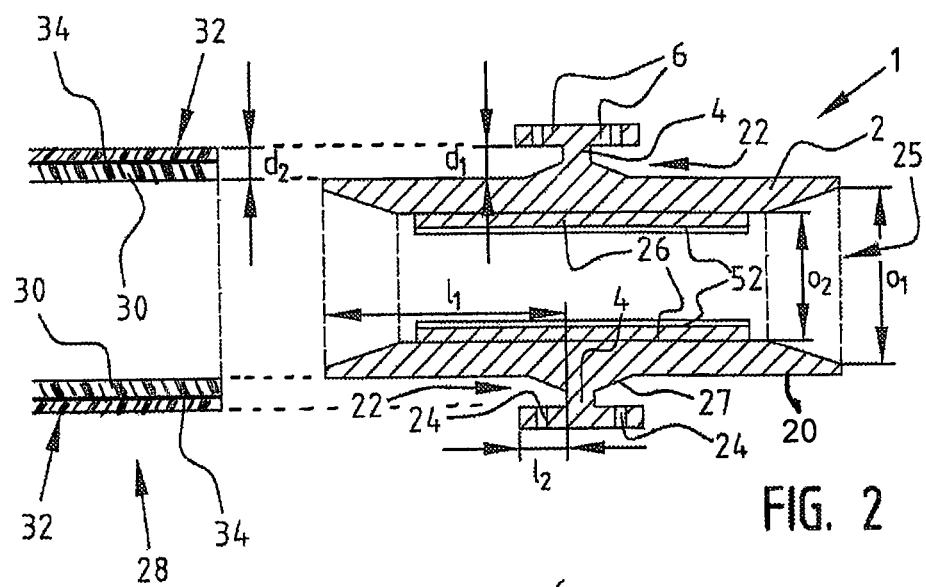
FIG. 2 shows a cross-section in axial direction of the coupling piece of FIG. 1 and a longitudinal section of an outer end of a multilayered conduit for coupling.

FIG. 2 shows a cross-section of coupling piece 1, wherein the annular widened portions 6 have a T-shape together with wall 4. Together with the outer side of coupling pipe 2 the T-shape encloses annular spaces 22, here also referred to as insertion space. A multilayered conduit 28 is shown which is constructed from an inner wall 30 and a thinner outer wall 32, with an aluminium layer 34 therebetween. The thickness of the wall is designated with d2.

At the position of the entry into insertion space 22 of the coupling pipe the radial distance d1 between the widened portion of the wall and the outer side of the coupling pipe is such that it is greater than or equal to the wall thickness of the conduit coupled to the coupling piece. Widened portions 6 are provided with through-openings 24 which serve as inspection holes.

The inner diameter o2 of the coupling pipe increases at exit 25 in outward direction to a value of o1. Arranged on the inner wall of coupling pipe 2 are axial connecting elements 26 in the form of ridges 26 of the same material as the coupling pipe. The ridges have an axial orientation and are preferably four in number, and present at equal mutual distances from each other. A connecting reinforcing layer 50, of which the engaging elements 52 are visible, is arranged over the inner wall, including ridges 26. See also FIG. 4 in this respect.

The coupling pipe has an axial insertion depth 11 over which it is pushed into a conduit end. Widened portion 6 has an axial length 12. In this view the value of 12 is roughly a factor of 5 smaller than 11, although a greater difference can be selected.

Figure 6:
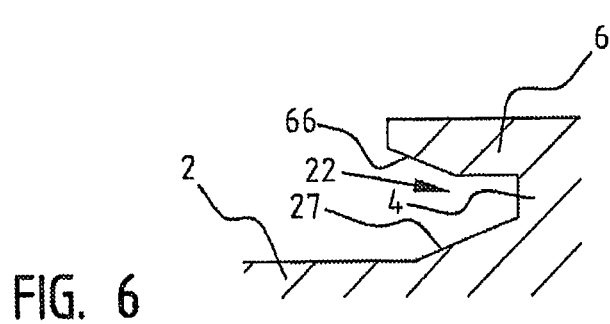
FIG. 6 shows a detail of a cross-section of the coupling piece according to the invention with a subsequent additional modification.

Annular space 22 narrows in the direction of the wall in that wall 27 of coupling pipe 2 tapers inside this space 22. The same tapering could otherwise also be provided for widened portion 6, as shown in FIG. 6.

Figure 3:
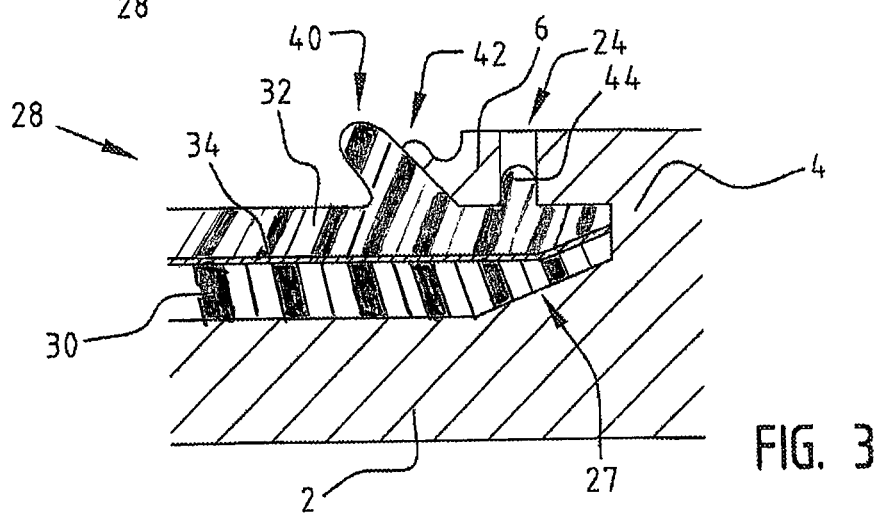
FIG. 3 shows a detail of the cross-section of the coupling piece according to FIG. 2 with a coupled outer end of a multilayered conduit.

FIG. 3 shows a detail of coupling piece 1 according to FIG. 2, wherein an outer end of a multilayered conduit 28 is fused by polyfusion welding according to the invention. Before the connection is effected, the contact surfaces of the coupling piece—i.e. widened portion 6, wall 4 and outer side 20 of coupling pipe 2—are heated by a welding mandrel, and the contact surfaces of conduit 28—i.e. inner wall 30, the edge at the outer end and a small part of outer wall 32—using a weld bush. During the fusion welding the inner wall 30 fuses with the outer side 20 of the coupling piece along the whole insertion length 11 and thus forms the most important connection between coupling piece and conduit. During sliding of the conduit over the coupling piece a part of inner wall 30 can be moved rearward by shear forces (not shown), but metal layer 34 is not exposed here because inner wall 30 is sufficiently thick. Widened portion 6 and wall 4 form an enclosing fused connection with the outer end of the conduit 28 which has been inserted into space 22 (see FIG. 3). A sealing of metal layer 34 is thus obtained which protects it against corrosion.

Owing to the tapering of wall 27 the plastic outer wall 32 is urged partially outward during sliding of the conduit outer end into annular space 22, whereby a protrusion 40 is created which forms a continuous, protruding weld rib 40 all around the annular widened portion. The end of widened portion 6 also deforms to a lesser extent at the same location and forms a protrusion 42. If the protruding weld rib 40 is continuous around the annular widened portion, without any interruptions, it will then be apparent to the user that a good fused connection has been obtained. It is otherwise noted that the plastic outer wall 32 is also urged partially into inspection hole 24 with a protrusion 44. This enhances still further the quality control of the fused connection.

Figure 4:
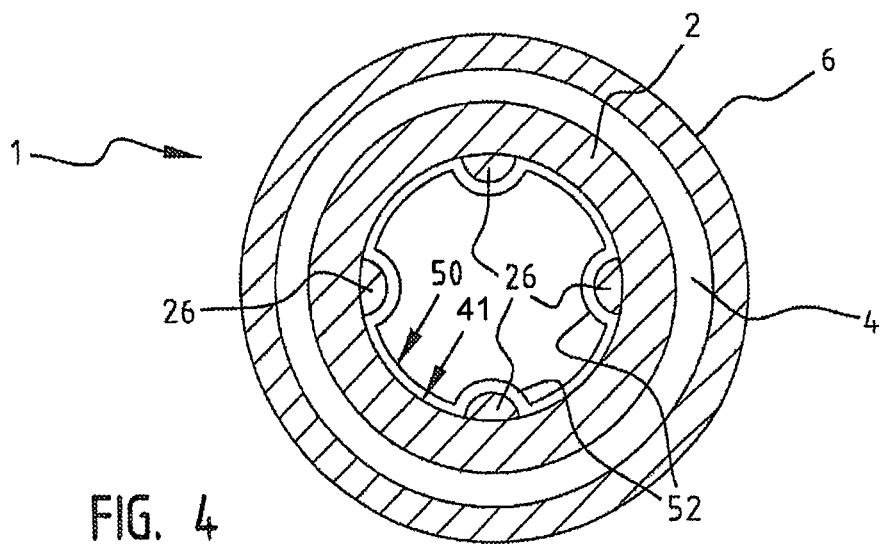
FIG. 4 is a view along the axial axis of the coupling piece of FIG. 2.

FIG. 4 shows a view along the axial axis of coupling piece 1 of FIG. 2, with the same numbered components as shown therein. The size of ridges 26 is exaggerated for the sake of clarity. Inner wall 41 of coupling pipe 2 and ridges 26 are covered with an adjacent reinforcing layer 50 according to the invention which comprises engaging elements 52 which correspond in shape and placing to connecting elements 26. The reinforcing layer can be embodied as a metal sleeve 50 with inward directed grooves 52 which is pushed into the passage of the coupling piece and, if desired, takes a releasable form. In an alternative embodiment the coupling piece is obtained by forming thereof in one step by 2K injection molding of a coupling pipe of PE-RT with a PVDF reinforcing layer. Layer 50 and coupling pipe 2 thus form an integral whole.

Figure 5:
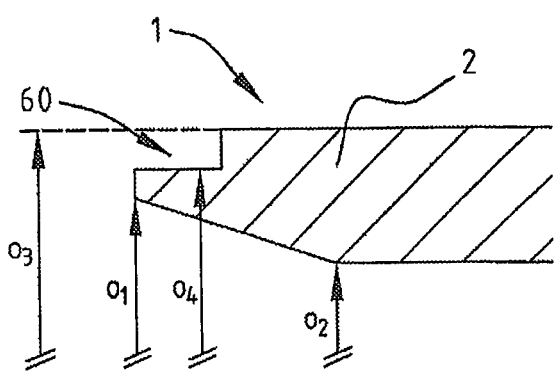
FIG. 5 shows a detail of a cross-section of the coupling piece according to the invention with an additional modification.

FIG. 5 shows a detail of a cross-section of coupling piece 1 according to the invention with an additional modification 60, i.e. an outer edge 60 at the position of exit 25, which has a reduced diameter o4 compared to outer diameter o3 of coupling pipe 2. Outer edge 60 thus comes less into contact with warm components during the polyfusion welding, thereby further preventing inward bending of coupling pipe at the exit edge.

FIG. 6 shows a detail of a cross-section of coupling piece 1, wherein an additional modification 66 is provided at the position of upright wall 4, i.e. wall 66 tapering on the front side of widened portion 6. Insertion space 22 thus narrows from two sides due to tapering inner walls 27 and 66, this further supporting the formation of a clearly visible weld rib.

The invention claimed is:

1. Coupling piece for an outer end of a multilayered conduit, comprising:
   a coupling pipe;
   a radially upright wall formed on and extending from an outer side of the coupling pipe, wherein the wall includes a widened portion that is wider than the wall in an axial direction of the pipe at a radial distance from the outer side, wherein the outer side of the coupling pipe, the upright wall and the widened portion form an annular insertion space into which an outer end of the multilayered conduit is directly insertable, and wherein the radial distance between the widened portion of the wall and the outer side of the coupling pipe, at a position of entry to the annular insertion space is equal to or greater than a wall thickness of the multilayered conduit;
   an adjacent reinforcing layer of reinforced plastic or of metal on an inner wall of the coupling pipe, the reinforcing layer including a material of greater strength than the coupling pipe; and
   axial engaging elements provided on the adjacent reinforcing layer, wherein the inner wall is provided with axial connecting elements which respectively correspond with and connect to the axial engaging elements.

2. The coupling piece of claim 1, wherein the annular insertion space narrows in a direction toward the wall such that the radial distance between the widened portion of the wall and the outer side of the coupling pipe decreases to a value smaller than the wall thickness of the multilayered conduit.

3. A method for coupling an outer end of a multilayered conduit to the coupling piece of claim 2 by polyfusion welding, the method comprising:
   heating contact surfaces of the coupling piece and of the outer end of the multilayered conduit;
   joining the contact surfaces and, after fusion, allowing an obtained fused connection to cool, wherein between the multilayered conduit and the coupling piece, a connecting weld rib is obtained which protrudes from the annular insertion space.

4. An assembly comprising:
   the coupling piece and the multilayered conduit obtained via the method of claim 3.

5. The coupling piece of claim 2, wherein the widened portion is shorter in the axial direction than an axial length of the coupling pipe as measured from the upright wall to an outer end of the coupling pipe.

6. The coupling piece of claim 5, wherein the widened portion is shorter in the axial direction by a factor of 4 or more.

7. The coupling piece of claim 2, wherein the upright wall and the widened portion have a T-shaped cross-section.

8. The coupling piece of claim 2, wherein the coupling piece is formed integrally.

9. The coupling piece of claim 2, wherein the coupling piece, but not the reinforcing layer thereof, is formed substantially from material comprising polyethylene (PE), reinforced PE or PE-Raised Temperature (RT).

10. The coupling piece of claim 2, wherein an inner diameter of the coupling pipe increases in an outward direction at an exit of the coupling pipe.

11. The coupling piece of claim 1, wherein the widened portion is relatively smaller in the axial direction than an axial length of the coupling pipe as measured from the upright wall to an outer end of the coupling pipe.

12. The coupling piece of claim 11, wherein the widened portion is relatively shorter in the axial direction by a factor of 4 or more.

13. The coupling piece of claim 1, wherein the upright wall and the widened portion have a T-shaped cross-section.

14. The coupling piece of claim 1, wherein the coupling piece is formed integrally.

15. The coupling piece of claim 1, wherein the coupling piece, but not the reinforcing layer thereof, is formed substantially from material comprising polyethylene (PE), reinforced PE or PE-Raised Temperature (RT).

16. The coupling piece of claim 1, wherein an inner diameter of the coupling pipe increases in an outward direction at an exit of the coupling pipe.

17. A method for coupling an outer end of a multilayered conduit to the coupling piece of claim 1 by polyfusion welding, the method comprising:
   heating contact surfaces of the coupling piece and of the outer end of the multilayered conduit;
   joining the contact surfaces and, after fusion, allowing an obtained fused connection to cool, wherein between the multilayered conduit and the coupling piece, a connecting weld rib is obtained which protrudes from the annular insertion space.

18. An assembly comprising:
   the coupling piece and the multilayered conduit obtained via the method of claim 17.

19. The coupling piece of claim 1, wherein the axial connecting elements are formed on the inner wall of the coupling pipe and the axial engaging elements are formed on the axial connecting elements.

* * * * *